(12) United States Patent
Miyata et al.

(10) Patent No.: US 11,637,789 B2
(45) Date of Patent: Apr. 25, 2023

(54) ORCHESTRATING APPARATUS, VNFM APPARATUS, MANAGING METHOD AND PROGRAM

(71) Applicant: NEC Corporation, Tokyo (JP)

(72) Inventors: Yuki Miyata, Tokyo (JP); Hajime Zembutsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 17/252,143

(22) PCT Filed: Jun. 14, 2019

(86) PCT No.: PCT/JP2019/023718
§ 371 (c)(1),
(2) Date: Dec. 14, 2020

(87) PCT Pub. No.: WO2019/240274
PCT Pub. Date: Dec. 19, 2019

(65) Prior Publication Data
US 2021/0258266 A1    Aug. 19, 2021

(30) Foreign Application Priority Data

Jun. 15, 2018    (JP) .............................. JP2018-114654

(51) Int. Cl.
*H04L 47/70*    (2022.01)
*H04L 12/46*    (2006.01)

(52) U.S. Cl.
CPC .......... *H04L 47/82* (2013.01); *H04L 12/4641* (2013.01)

(58) Field of Classification Search
CPC ..... H04L 47/82; H04L 12/4641; H04L 47/74; H04L 47/78; H04L 47/781; G06F 9/455; G06F 9/50; G06F 11/14
See application file for complete search history.

(56) References Cited

U.S. PATENT DOCUMENTS 10,326,653 B2 *    6/2019    Wu ...................... H04L 41/082
10,481,935 B2    11/2019    Iwashina et al.
(Continued)

FOREIGN PATENT DOCUMENTS

EP        3503481 A1    6/2019
JP    2015194949 A *    11/2015
(Continued)

OTHER PUBLICATIONS

International Search Report corresponding to PCT/JP2019/023718, 1 page, dated Sep. 10, 2019.
(Continued)

*Primary Examiner* — Sm A Rahman

(57) ABSTRACT

An orchestrating apparatus, comprising: a receiving part that receives virtual resource information attached to a VNF (Virtualized Network Function) from a VNFM (Virtualized Network Function Manager) that generated the VNF; a storage part that stores the virtual resource information in correspondence with the VNF; and a synchronizing part that transmits the virtual resource information corresponding to a designated VNF to a VNFM that has lost correspondence between the VNF and the virtual resource information, and causes the VNFM to restore the virtual resource information assigned to the VNF.

15 Claims, 12 Drawing Sheets

(56) References Cited

U.S. PATENT DOCUMENTS

| | | | |
|---|---|---|---|
| 10,693,807 B2* | 6/2020 | Clarke | H04L 67/10 |
| 10,756,999 B2* | 8/2020 | Yang | H04L 41/00 |
| 10,999,219 B1* | 5/2021 | Athreyapurapu | H04L 41/0806 |
| 2016/0328258 A1 | 11/2016 | Iwashina et al. | |
| 2017/0257276 A1 | 9/2017 | Chou et al. | |
| 2019/0190784 A1 | 6/2019 | Shimojou et al. | |
| 2019/0334777 A1 | 10/2019 | Chou et al. | |

FOREIGN PATENT DOCUMENTS

| | | |
|---|---|---|
| JP | 2017-532822 A | 11/2017 |
| WO | WO-2015/099036 | 7/2015 |
| WO | WO-2016/121834 | 8/2016 |
| WO | WO-2016/121869 | 8/2016 |
| WO | WO-2018/034156 | 2/2018 |

OTHER PUBLICATIONS

ETSI GS NFV-MAN 001 V1.1.1 (Dec. 2014) Network Functions Virtualisation (NFV); Management and Orchestration, online, <http://www.etsi.org/deliver/etsi_gs/NFV-MAN/001_099/001/01.01.01_60/gs_NFV-MAN001v010101p.pdf>, 184 pages.

* cited by examiner

FIG. 5

| VNFR | VIRTUAL RESOURCE | ... |
|---|---|---|
| VNF#1 | VIRTUAL RESOURCE#1 | ... |
| VNF#2 | VIRTUAL RESOURCE#2 | ... |
| VNF#3 | VIRTUAL RESOURCE#3 | ... |
| VNF#4 | VIRTUAL RESOURCE#4 | ... |
| VNF#5 | VIRTUAL RESOURCE#5 | ... |
| ... | ... | ... |

ORCHESTRATING APPARATUS, VNFM APPARATUS, MANAGING METHOD AND PROGRAM

DESCRIPTION OF RELATED APPLICATIONS

This application is a national stage application of International Application No. PCT/JP2019/023718 entitled "ORCHESTRATING APPARATUS, VNFM APPARATUS, MANAGING METHOD AND PROGRAM," filed on Jun. 14, 2019, which claims the benefit of the priority of Japanese Patent Application No. 2018-114654 filed on Jun. 15, 2018, the disclosures of each of which are hereby incorporated by reference in their entirety.

FIELD

The present invention relates to an orchestrating apparatus, a VNFM apparatus, a managing method, and a program.

BACKGROUND

The ETSI NFV defines the architecture of NFV (see NPL 1). In the virtualized network MANO (Management and Orchestration) are defined a VIM, which manages a virtualized infrastructure, a VNFM, which manages the VNFs that make up network services, and an NFVO, which controls them. VIM, VNF and VNFM stand for Virtualized Infrastructure Manager, Virtual Network Function and VNF Manager, respectively. Also, VNF is composed of VNFCs (VNF Components), and VNFC is performed on a single VM (Virtual Machine). Hereinafter, "cloud infrastructure" is described as ones equivalent to VIM in NFV, and "service" is described as ones including network services in NFV.

Patent Literature 1 discloses a configuration in which the above-described NFVO, VNFM and VIM have a database (hereinafter referred to as "DB") that holds various data according to their respective purposes, and in which discrepancies in corresponding data between the DBs and deviations from the actual state can be resolved. More concretely, Patent Literature 1 describes that a DB of NFVO and a DB of VNFM may hold duplicate data related to VNFR (VNF Record), respectively, and in such cases, the values of the data are matched between the DBs (see paragraph 0039).
[Patent Literature (PTL) 1] WO2016/121869A1
[Non Patent Literature (NPL) 1] ETSI GS NFV-MAN 001 V1.1.1 (2014-12) Network Functions Virtualisation (NFV); Management and Orchestration, [online], [retrieved 15 Jun. 2018], Internet <http://www.etsi.org/deliver/etsi_gs/NFV-MAN/001_099/001/01.01.01_60/gs_NFV-MAN001v010101p.pdf>

SUMMARY

The following analysis is given by the present invention. FIG. 10 shows a basic architecture of the NFV-MANO. The Orchestrator (orchestrating apparatus) in FIG. 10 corresponds to the above NFVO and controls the VNFM and VIM. In addition, in the configuration shown in FIG. 10, recovery from VNFM equipment failure or system failure and backup turnaround operations may occur. When this type of work is performed, not only the VNFM may lose the VNFR (VNF Record) that it has maintained up to that point, but also the information linking the VNFR to the virtual resources (correspondence). Here, virtual resources may include virtual resources managed by the VIM as well as virtual resources in a virtual resource pool.

The linking information (correspondence) between VNFR and virtual resource will be described here. FIG. 11 shows a sequence of NFV standard VNF Instantiation of NFV standard. As shown in FIG. 11, the VNFM generates VNFR information upon instruction from the NFVO (3. Grant Lifecycle Operation). After virtual resource assignment in the VIM is completed, the VNFM creates an instance of the VNF (10. Configure VNF). At this time, the VNFM retains the information linking the VNFR to the virtual resource (e.g., vnfr: vdu in NPL 1). On the other hand, the VIM is a virtual resource management system and does not maintain the VNFR, which is the unit information of the VNF. In addition, NFVO, as the name implies, is a functional block responsible for orchestrating VNFM and VIM and does not maintain virtual resource information. Therefore, the VNFM is the only one that maintains information that ties the VNFR to the virtual resources (correspondence), and if the VNFM loses this information due to a failure or other factors, there is no way to recover the VNFM by synchronizing it with adjacent functional blocks.

In PTL 1, by synchronizing the DBs of NFVO and VNFM, the VNFRs maintained in the DBs of NFVO and VNFM, respectively, can be matched. However, as described above, the VNFR and virtual resource linkage information (correspondence) is information that is maintained only by the VNFM and cannot be recovered even with the technology of PTL 1.

As a practical matter, when the linking information (correspondence) between VNFR and the virtual resource is lost, a measure is taken such that the virtual resource is deleted and the VNF is rebuilt. However, if this measure is taken, there is a problem that the VNF service is interrupted until the restoration because the virtual resource is temporarily deleted.

It is an object of this invention to provide an orchestrating apparatus, a VNFM apparatus, a management method, and a program that contribute to enrichment of means to recover the correspondence between VNFR and virtual resources that has been lost in the above VNFM.

According to a first aspect of the present invention or disclosure, there is provided an orchestrating apparatus, comprising: a receiving part that receives virtual resource information attached to a VNF (Virtualized Network Function) from a VNFM (Virtualized Network Function Manager) that generated the VNF; a storage part that stores the virtual resource information in correspondence with the VNF; and a synchronizing part that transmits the virtual resource information corresponding to a designated VNF to a VNFM that has lost correspondence between the VNF and the virtual resource information, and causes the VNFM to restore the virtual resource information assigned to the VNF.

According to a second aspect of the present invention or disclosure, there is provided, a VNFM apparatus, comprising: a VNF generating part that requests an assignment of a virtual resource to VIM (Virtualized Infrastructure Manager) in response to a request from an orchestrating apparatus of NFV (Network Function Virtualization) and generates a VNF (Virtualized network Function); and a notifying part that transmits the assigned virtual resource information to the orchestrating apparatus and causes the orchestrating apparatus to hold correspondence between the VNF and the virtual resource information.

According to a second aspect of the present invention or disclosure, there is provided, a managing method of VNF (Virtualized Network Function) information, comprising:

receiving virtual resource information assigned to a VNF from a VNFM (Virtualized Network Function Manager) that has generated the VNF; storing the VNF and the virtual resource information in correspondence each other; transmitting the virtual resource information corresponding to a designated VNF to a VNFM that has lost correspondence between the VNF and the virtual resource information; and causing the VNFM to restore the virtual resource information assigned to the VNF.

As for the latter method of managing VNF information to be implemented in the VNFM apparatus, in response to a request from an orchestrating apparatus of an NFV (Network Function Virtualization) to the Virtualized Infrastructure Manager (VIM), a Virtualized Network Function (VNF) is generated by requesting an assignment of a virtual resource, and followed by transmitting the assigned virtual resource information to the orchestrating apparatus, to cause the VNF and the virtual resource information to be kept in correspondence with the virtual resource information. These methods are tied to a specific machine, a NFVO apparatus or a VNFM apparatus, respectively.

According to a fourth aspect of the present invention or disclosure, there is provided, a program for causing a computer, to execute: a process of receiving a virtual resource information assigned to a VNF (Virtualized Network Function) from a VNFM (Virtual Network Function Manager) that generates the VNF; a process of storing a correspondence between the VNF and the virtual resource information; a process of transmitting the virtual resource information corresponding to a designated VNF to a VNFM that has lost correspondence between the VNF and the virtual resource information; and a process of causing the VNFM to restore the virtual resource information assigned to the VNF.

According to the present invention, it is possible to rapidly recover the correspondence between VNFR and virtual resources that has been lost in VNFM. In other words, the present invention transforms the basic architecture of NFV-MANO shown in the background art into ones with dramatically improved recovery capabilities.

BRIEF DESCRIPTION OF THE DRAWINGS

FIG. 5 is a diagram showing an example of information maintained by an Orchestrator of the first exemplary embodiment.

PREFERRED MODE

Figure 1:
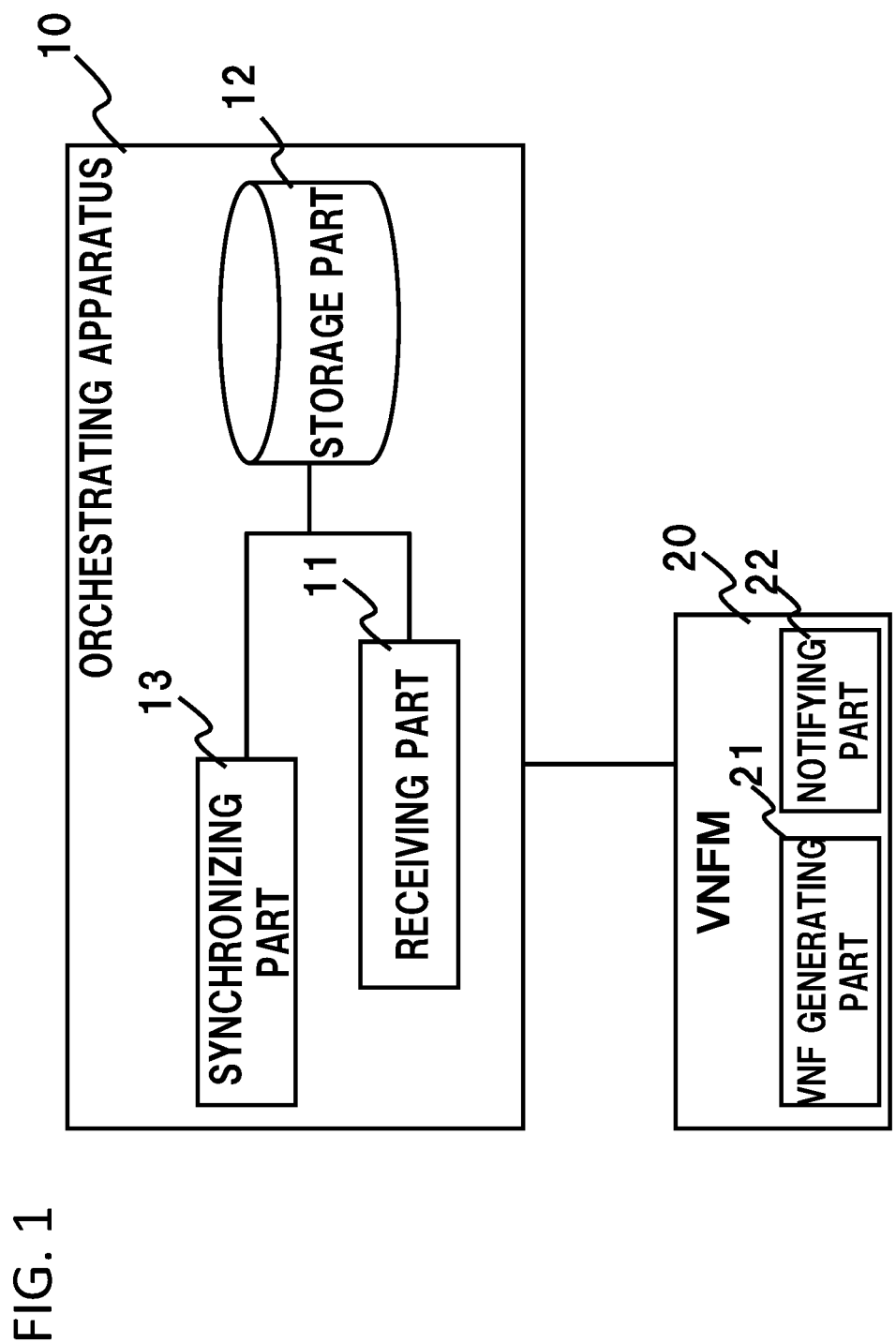
FIG. 1 is a block diagram showing an outline of an exemplary embodiment of the present invention.

An overview of one exemplary embodiment of the present invention will be described with reference to the drawings. The reference signs in the drawings appended to this outline are provided for convenience as an example for facilitating understanding, and not intended to limit the present invention to the illustrated modes. And each connection line between blocks in the referenced drawings appearing in the following description includes both bi-directional and single-directional. A single-directional arrow describes main data flow schematically, which, however, does not exclude bi-directionality. The program is executed via a computer device, the computer device including, for example, a processor, a storage device, an input device, a communication interface, and, if necessary, a display device. The computer device is configured to communicate with an equipment (including a computer), whether wired or wireless, in the device or with external devices (including a computer) via the communication interface. There are input port and output port, respectively in each joint point of block diagram in the figures, while not illustrated in the figures. The same applies to input/output interfaces. In the following description, "A and/or B" is used in the sense of at least one of A and B.

The present invention can be realized in an orchestrating apparatus 10 including a receiving part 11, a storage part 12, a synchronizing part 13, as shown in FIG. 1, in one exemplary embodiment thereof.

Figure 2:
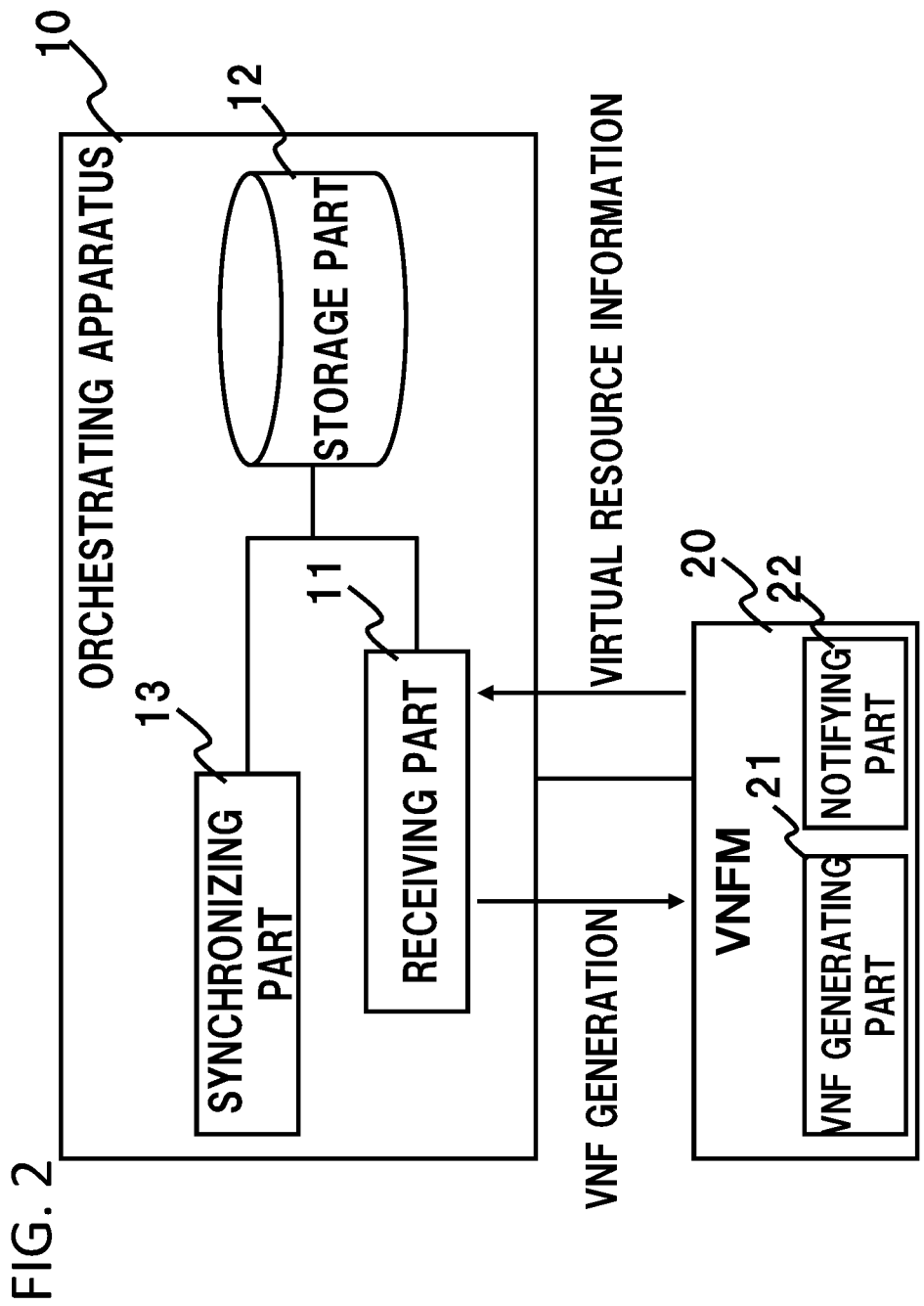
FIG. 2 is a diagram showing an operation of an exemplary embodiment.

More concretely, an orchestrating apparatus 10 instructs a VNFM 20 to generate a VNF on an occasion of receiving a request for a VNF service from an OSS/BSS or the like ("VNF generation" in FIG. 2). A receiving part 11 receives virtual resource information assigned to the VNF from the VNFM 20, which generated the VNF based on the aforementioned instructions (the "virtual resource information" in FIG. 2). A storage part 12 stores the VNF and the virtual resource information in correspondence with each other.

Figure 3:
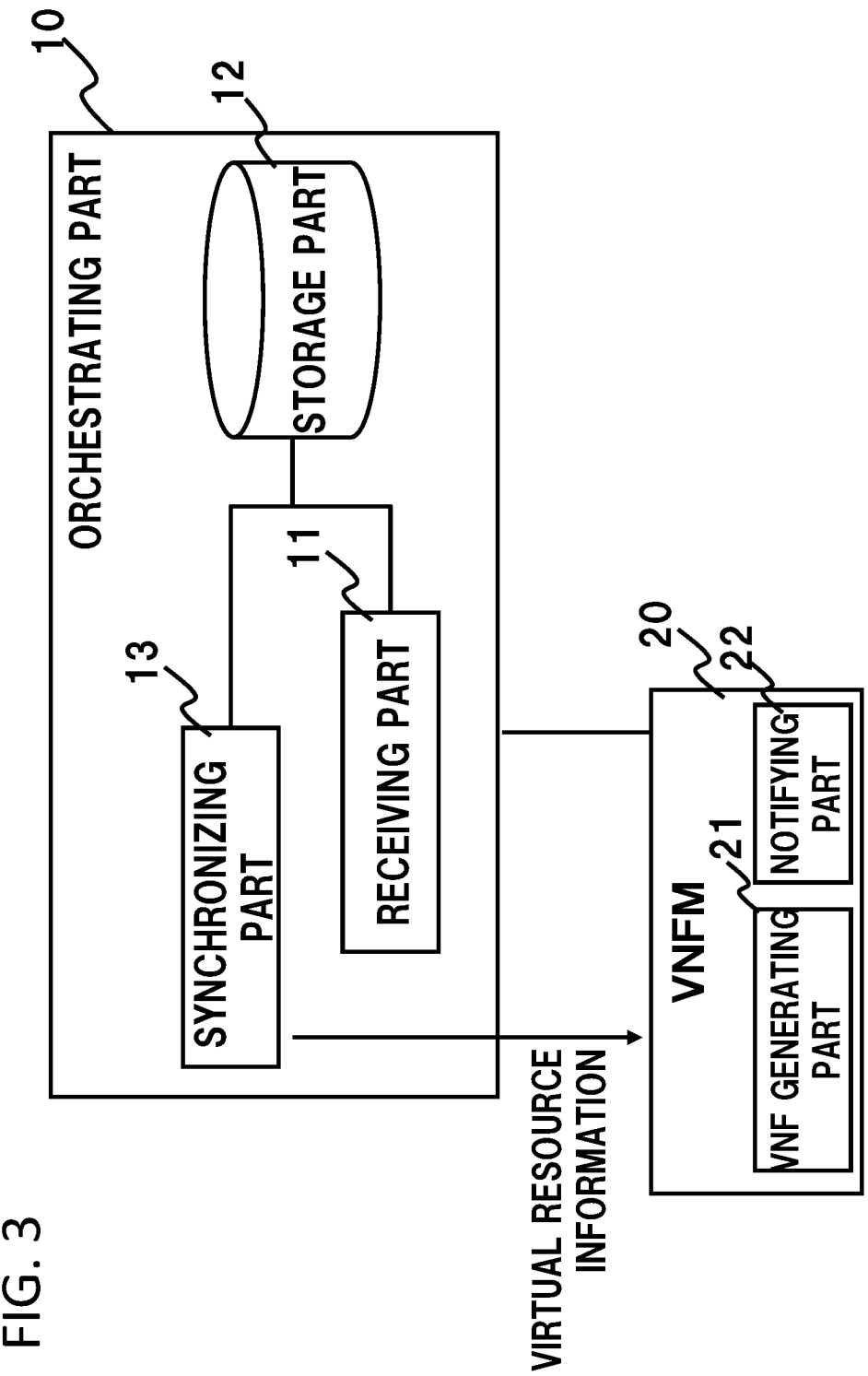
FIG. 3 is a diagram showing an operation of an exemplary embodiment.

A synchronizing part 13 transmits the virtual resource information corresponding to a specified VNF to the VNFM 20, which has lost the correspondence between said VNF and said virtual resource information (the "virtual resource information" in FIG. 3). The VNFM 20 that receives said virtual resource information restores the correspondence between the VNF and the virtual resource information assigned to the VNF. The timing of the transmission of said virtual resource information by the synchronizing part 13 can be an opportunity such as an occurrence of a specific event in the VNFM 20 (failure recovery or cutback completion notification) or a receipt of a synchronization request from the outside.

The VNFM 20, on the other hand, includes a VNF generating part 21 and a notifying part 22. The VNF generating part 21 requests a Virtualized Infrastructure Manager (VIM) to assign a virtual resource in response to a request from the orchestrating apparatus 10, and generates a VNF (Virtualized Network Function). The notifying part 22 sends the assigned virtual resource information to the orchestrating apparatus 10, and causes the orchestrating apparatus 10 to hold a correspondence between the VNF and the virtual resource information.

The above enables to avoid a significant interruption of VNF services even in the event that the information (correspondence) linking the VNFM 20 or VNFR to the virtual resources is lost caused by a VNFM equipment failure, recovery from a system failure, or backup turnaround.

First Exemplary Embodiment

Figure 4:
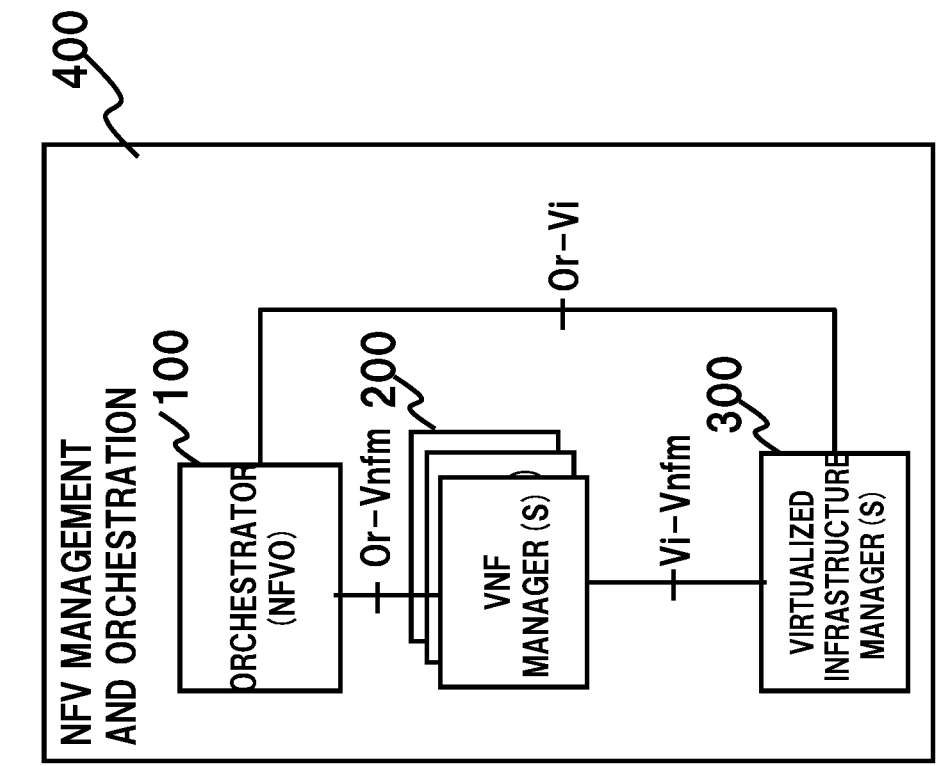
FIG. 4 is a diagram showing a configuration of NFV-MANO of a first exemplary embodiment.

A first exemplary embodiment of the present invention will now be described in detail with reference to the drawings. FIG. 4 illustrates a configuration of an NFV-MANO of the first exemplary embodiment of the invention. Referring to FIG. 4, an NFV-MANO 400 including an orchestrating apparatus (NFVO) 100, a VNF Manager(s) 200, and a Virtualized Infrastructure Manager(s) 300 is shown.

An orchestrating apparatus 100 is connected to VNF Manager(s) 200 via an interface denoted by reference point Or-Vnfm. The orchestrating apparatus 100 is connected to the VNF Manager(s) 200 via an interface denoted by a reference point Or-Vi It is connected to a Virtualized Infrastructure Manager(s) 300 via an interface. The Orchestrating apparatus 100 corresponds to the orchestration apparatus described above, and is equipped with a receiving part 11, a storage part 12, and a synchronizing part 13, as described above (see FIG. 1).

A VNF Manager(s) 200 represents one or more VNFMs that manage the VNFs formulating the network services. Unless otherwise distinguished, one VNF Manager included in the VNF Manager(s) 200 is hereinafter referred to as "VNFM 200".

The VNFM 200 confirms whether or not the VNFR is held at a predetermined opportunity, such as receiving a synchronization request from an external source such as an orchestrating apparatus 100 or Sender. If, as a result of the confirmation, it is found that the specified VNFR is not held, the VNFM 200 asks the orchestrating apparatus (NFVO) 100 for the VNF virtual resource and acquires the correspondence between the VNF and the virtual resource information. The VNFM 200 then uses the acquired information to recover the information (correspondence) linking the VNFR and the virtual resource.

A Virtualized Infrastructure Manager(s) 300 represents one or more VIMs that manage the virtualized infrastructure. Unless otherwise distinguished, one VIM included in the Virtualized Infrastructure Manager(s) 300 is hereinafter referred to as "VIM 300".

FIG. 5 illustrates an example of information held by the Orchestrating apparatus 100. The example in FIG. 5 shows a table storing entries that correspond to VNFR and virtual resource information (unique ID). In the example in FIG. 5, the VNFR and the virtual resource information are mapped on a one-to-one basis; however, one VNFR may be mapped to multiple virtual resources. As the virtual resource information (unique ID), an information element termed vnfr: "vnfc_instance" in vnfr:vdu may be used (see 6.3.2.4 Virtual Deployment Unit in NPL 1).

Figure 6:
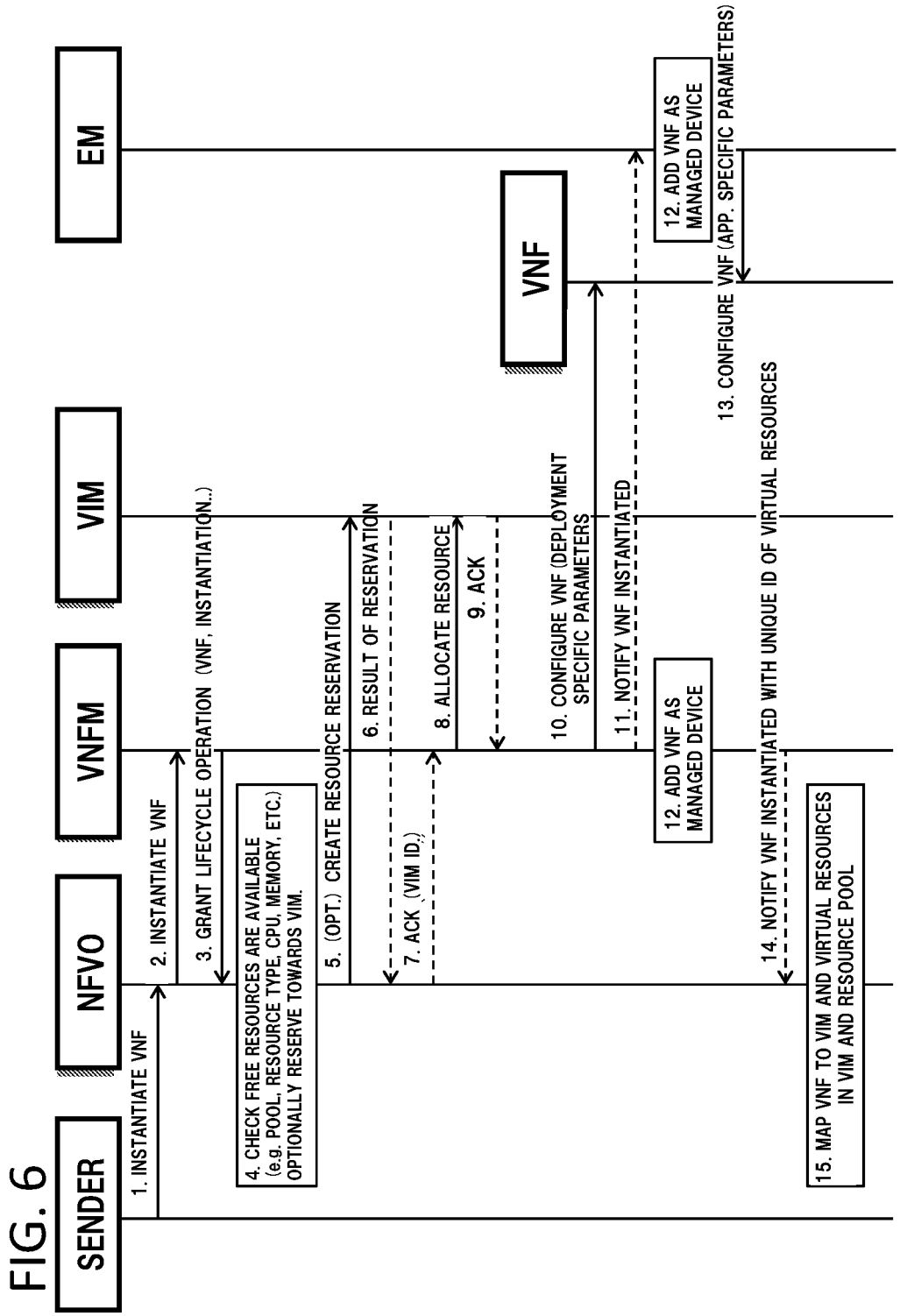
FIG. 6 is a sequence diagram showing an operation of the first exemplary embodiment.
Figure 10:
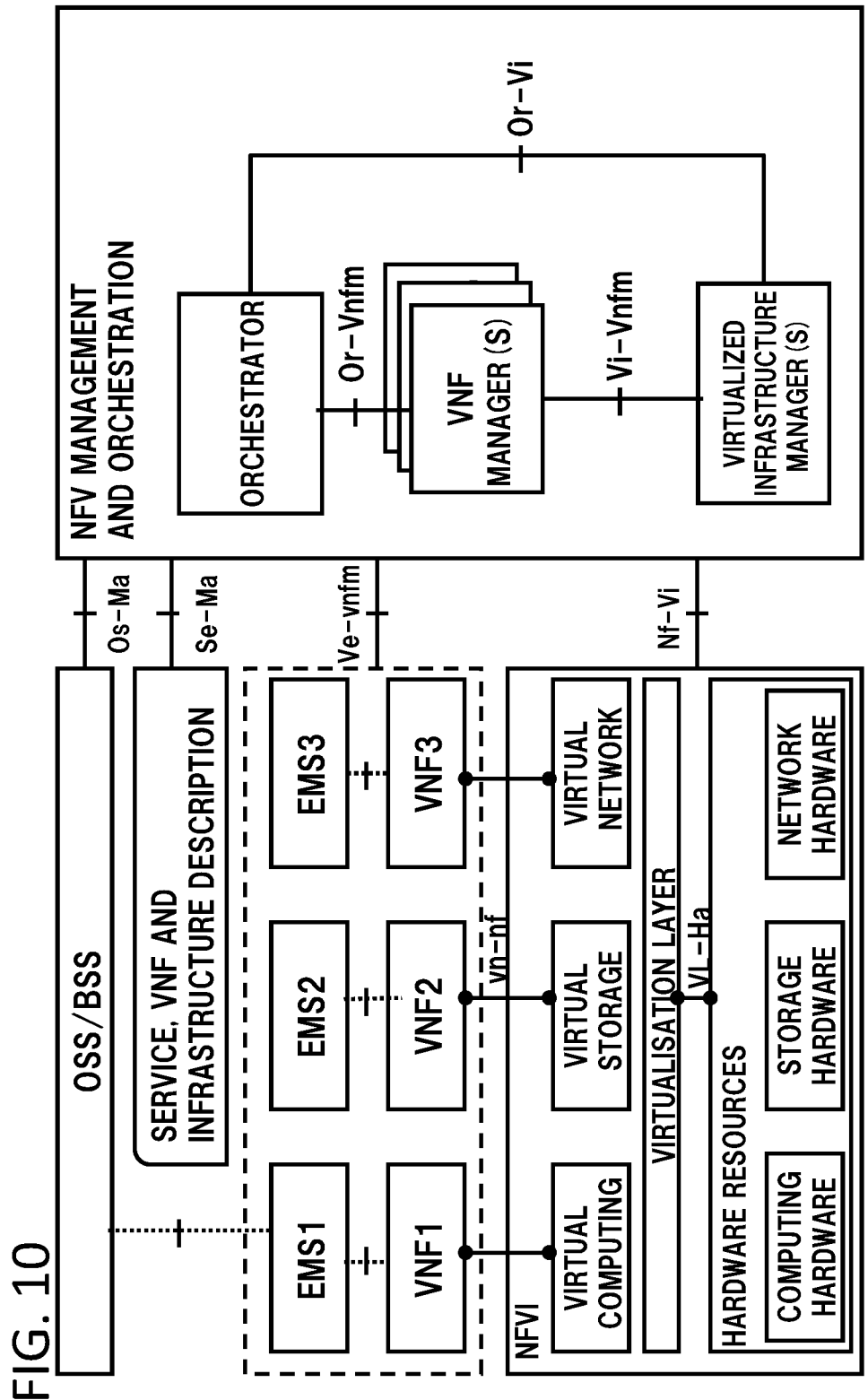
FIG. 10. is a diagram showing a fundamental architecture of NFV-MANO.
Figure 11:
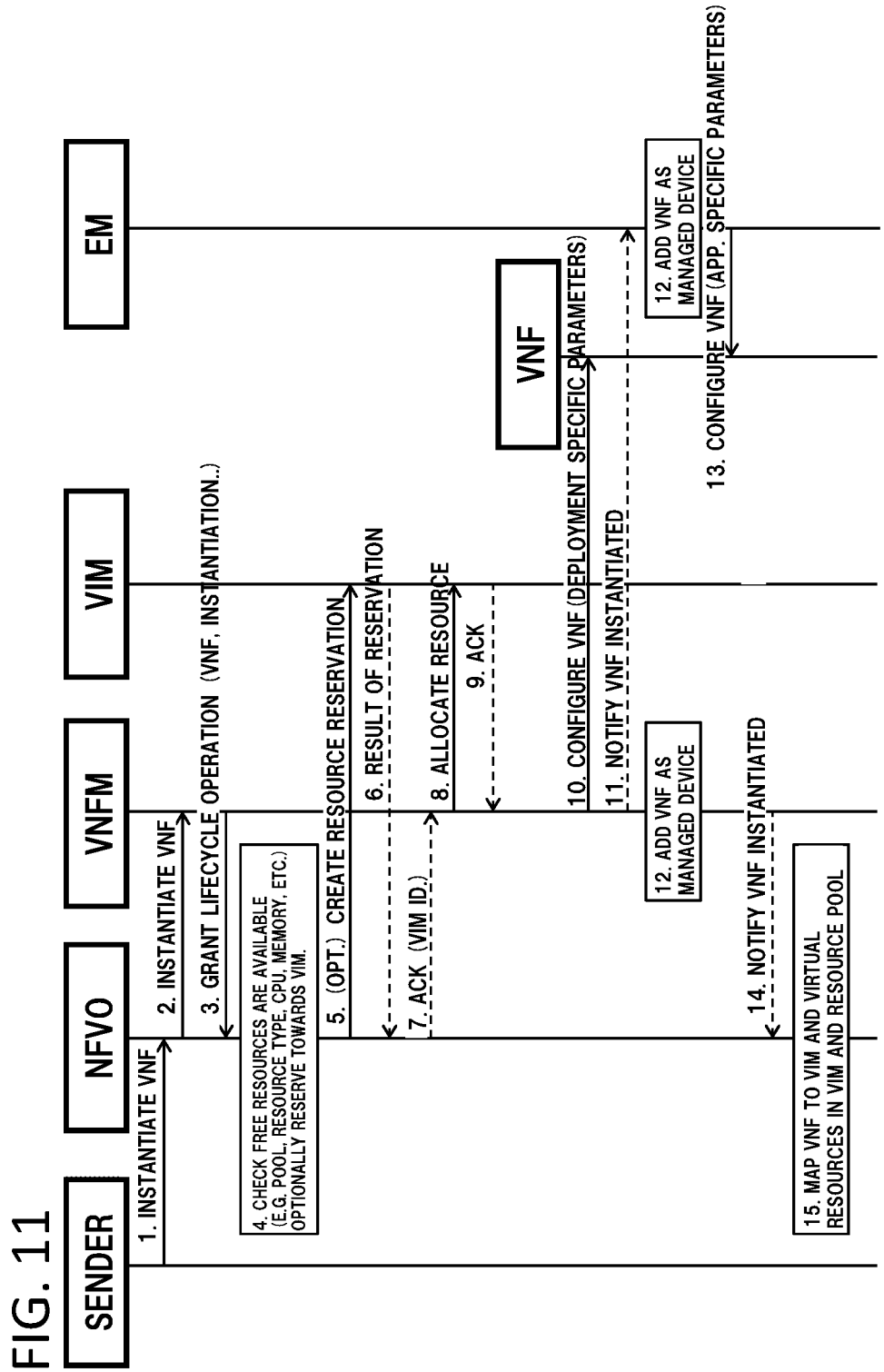
FIG. 11. is a diagram showing an operation of NFV-MANO.

The operation of the present exemplary embodiment will now be described in detail with reference to the drawings. FIG. 6 is a sequence diagram representing the operation of the first exemplary embodiment of the present invention. The basic flow of FIG. 6 is similar to the sequence of VNF Instantiation of the NFV standard shown in FIG. 11. That is, Sender instructs the NFVO (orchestrating apparatus 100 in FIG. 4) to generate a VNF (1. Instantiate VNF). Here, Sender refers to the maintainer or a higher-level device (e.g., OSS/BSS of FIG. 10).

Next, the NFVO instructs the VNFM (VNFM 200 in FIG. 4) to generate the VNF (2. Instantiate VNF); the VNFM specifies the VNF to the NFVO and requests a permission to generate it (3. Grant Lifecycle Operation).

Next, the NFVO checks whether or not free virtual resources are available (4. Check free resources are available). At this point, the NFVO may perform a reservation of the virtual resources to the VIM. Concretely, the NFVO performs the reservation of the virtual resource to the VIM (5.(opt.) Create Resource Reservation to 6. Result of Reservation)

Next, the NFVO sends the permission, to the VNFM, to create the VNF (7. ACK). Upon receiving the permission to create the VNF, the VNFM requests the VIM to assign a virtual resource to the corresponding VNF (8. Assign Resource-9. ACK).

After the assignment of the virtual resources is completed, the VNFM configures the VNF (10. Configure VNF). This creates a VNFR. The VNFM also notifies the EM that the VNF has been created (11. Notify VNF Instantiated). Here, EM is a functional block that manages devices and other devices called Element Management (system).

The EM, which has received the VNFM and the aforementioned notification, adds the notified VNF to a managed device (target of management) (12. Add VNF as managed device). The EM sets certain parameters, etc. to the VNF (13. Configure VNF).

The generation of the VNF is completed by the above. Next, the VNFM sends a VNF generation notification to the NFVO, including the unique ID of the virtual resources assigned to the VNF (14. Notify VNF instantiated with unique ID of Virtual Resources).

The NFVO that receives the VNF generation notification above stores the correspondence between the VNFR and the virtual resources (15. Map VNF to VIM and virtual resources . . . ).

With the above, the NFVO holds the correspondence between the VNFR and the virtual resources assigned to the VNF in this exemplary embodiment. Thereafter, the NFVO will also be able to track the virtual resource information managed by the VIM system using the unique ID of this virtual resource at the Or-Vi interface.

Next, it is explained in detail about the operation to make the VNFM, which has lost the correspondence between the VNFR and the virtual resources, hold the correspondence between the VNFR and the virtual resources again (hereinafter referred to as a "synchronization process"). The following is a detailed description of the synchronization process with reference to the drawings.

Figure 7:
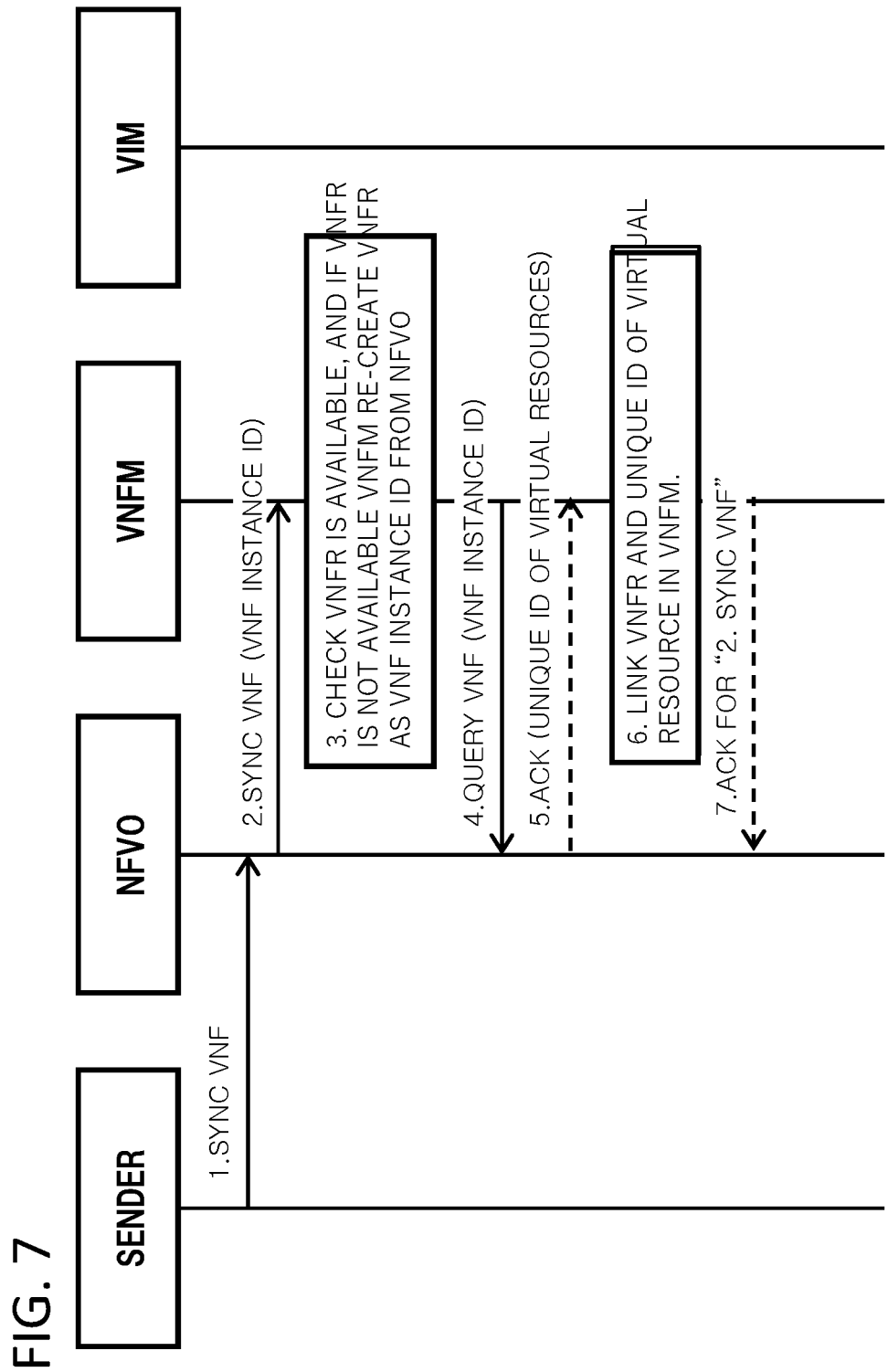
FIG. 7 is a sequence diagram showing an operation (synchronizing process) of the first exemplary embodiment.

FIG. 7 is a sequence diagram depicting the operation (synchronous processing) of the first exemplary embodiment of the present invention. Referring to FIG. 7, first, the Sender instructs the NFVO to perform simultaneous processing (1. Sync VNF). Next, the NFVO makes a synchronization request to the VNFM, specifying a VNF instance ID (2. Sync VNF (VNF instance ID)).

The VNFM that received the above synchronization request checks whether the VNFR of the ID is retained in the memory part (FIG. 5), and if not, it assumes that the VNFR has been lost and recreates the VNFR (3. Check VNFR is Available~). Here, when the VNFR information of the corresponding ID exists, the corresponding virtual resource information is retained, and the subsequent processing can be omitted.

The VNFM then queries the NFVO for the unique ID of the corresponding virtual resource by specifying the VNF instance ID (4. Query VNF (VNF instance ID)). when the VNFM receives the unique ID of the virtual resource from the NFVO (5. Ack), it stores Save the correspondence between VNFRs and virtual resources in Part 12 (6. Link VNFRs and Unique ID of Virtual Resource~).

When the storage of the correspondence between the VNFR and the virtual resource is completed, the VNFM notifies the NFVO that the synchronization process has been completed (7. Ack~).

As described above, according to the present exemplary embodiment, it is possible to recover the correspondence between the VNF and the virtual resources that should be maintained in the VNFM without having to go through procedures such as deleting the virtual resources and rebuilding the VNF.

Second Exemplary Embodiment

In the first exemplary embodiment described above, it was explained that the NFVO receiving the request from the Sender makes a synchronization request by specifying a VNF instance ID, but a mode in which the Sender makes a direct synchronization request to the VNFM by specifying a VNF instance ID can also be adopted.

Figure 8:
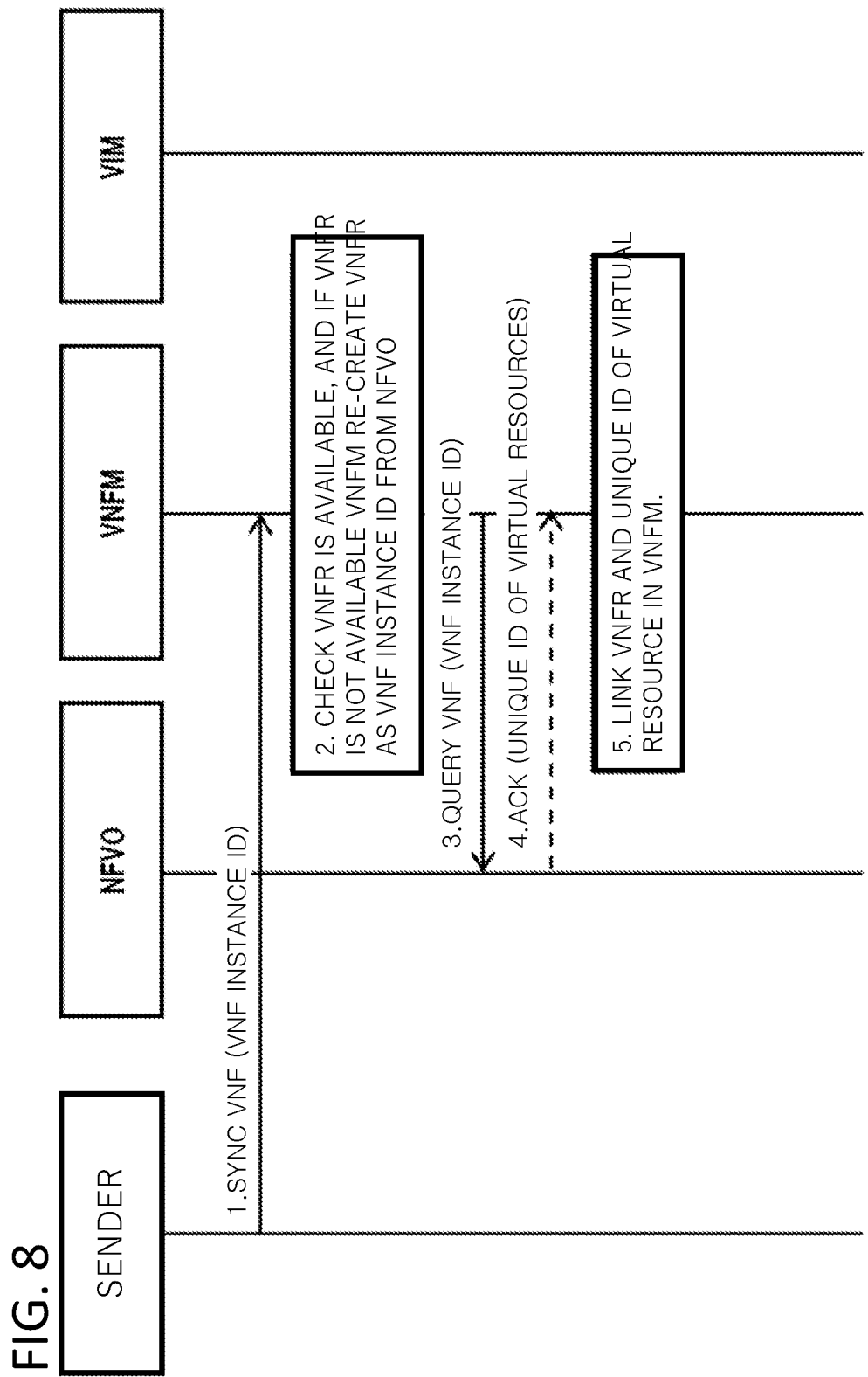
FIG. 8 is a sequence diagram showing an operation (synchronizing process) of a second exemplary embodiment.

FIG. 8 is a sequence diagram showing the operation (synchronization process) of the second exemplary embodiment in which Sender makes a direct synchronization request. The difference from the first exemplary embodiment shown in FIG. 7 is that Sender makes a direct synchronization request to the VNFM and the NFVO only responds to a query for a virtual resource.

According to this exemplary embodiment, it is possible to check whether or not the VNFM holds the correspondence between the VNFR and the virtual resource without going through the NFVO, and to perform the synchronization process if necessary. This exemplary embodiment can be suitably employed in cases where there is a high degree of independence between the NFVO and the VNFM, such as when the NFVO and the VNFM have different providers to manage from one another.

Third Exemplary Embodiment

In the first and second exemplary embodiments described above, the synchronization request is made by specifying the VNF instance IDs individually, but the synchronization process of multiple VNFs can also be performed consecutively.

Figure 9:
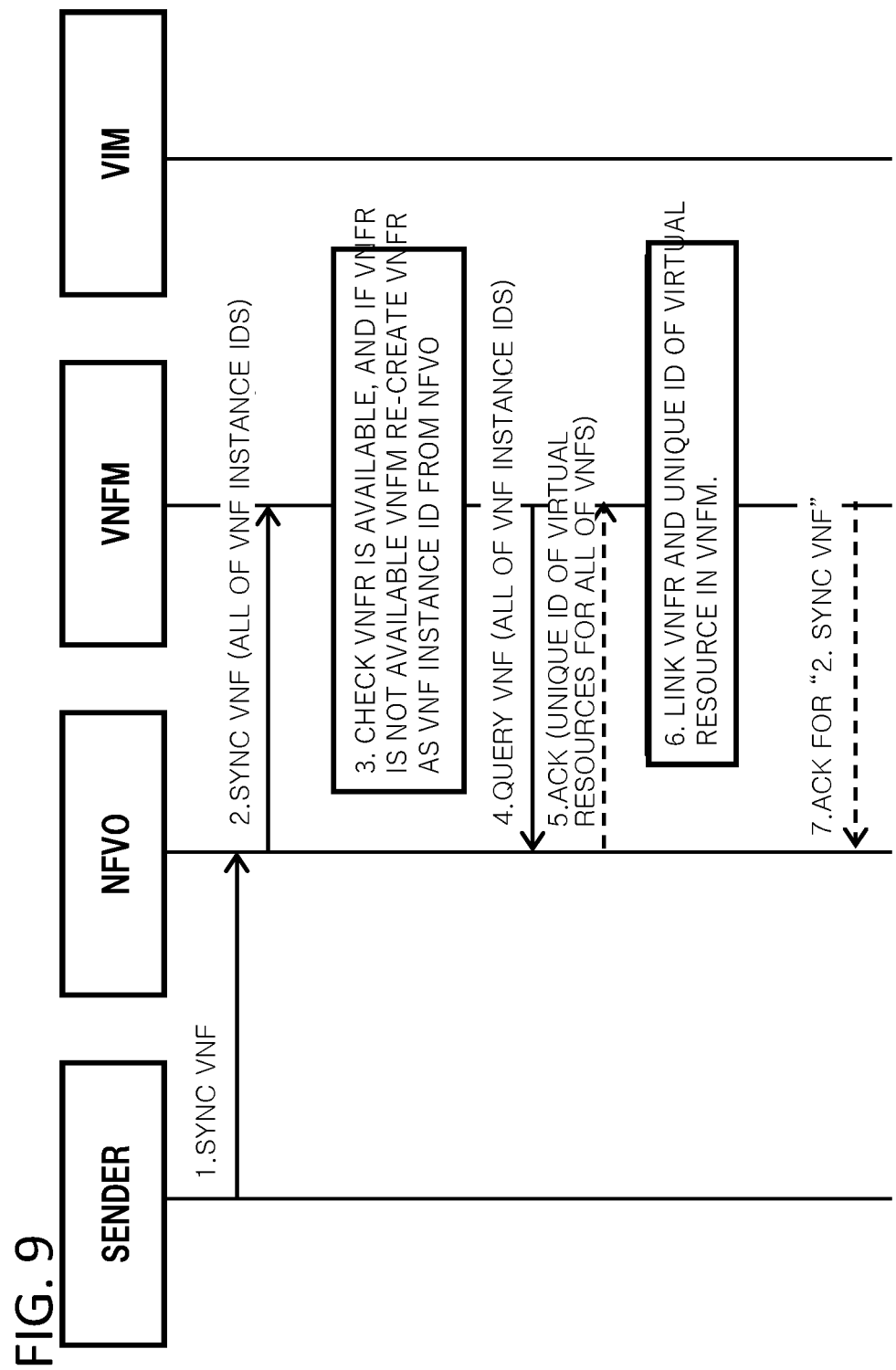
FIG. 9 is a sequence diagram showing an operation (synchronizing process) of a third exemplary embodiment.

FIG. 9 is a sequence diagram depicting the operation (synchronization process) of a third exemplary embodiment in which the synchronization process of a plurality of VNFs is carried out in succession. The difference from the first exemplary embodiment shown in FIG. 7 resides in that the NFVO, which received a synchronization request from the Sender, makes a synchronization request for all VNF instance IDs to the VNFM.

According to the present exemplary embodiment, the Sender and NFVO can check whether or not the correspondence between the VNFR and the virtual resource is held for a plurality of VNFs and perform the synchronization process as necessary, without requiring the Sender and NFVO to synchronize to the VNFM each time. This not only reduces the amount of signals exchanged between the Sender, NFVO and VNFM, but also reduces the load on the NFVO and VNFM.

In the example of FIG. 9, it is explained that the NFVO makes a synchronization request for all VNF instance IDs to the VNFM, but a configuration in which the NFVO makes a synchronization request to the VNFM by specifying a plurality of VNF instance IDs can also be adopted. In the example in FIG. 9, the Sender makes a synchronization request via the NFVO, but, as in the second exemplary embodiment, a configuration in which the Sender makes a synchronization request for multiple VNFs directly to the VNFM can also be adopted.

In the first to third exemplary embodiments described above, it was explained that Sender sends a synchronization request, but a configuration in which the NFVO automatically makes a synchronization request can also be adopted. For example, the NFVO may make a synchronization request to the VNFM on the occasion of any work that may have lost the correspondence between the VNF and the virtual resource information, such as recovery from a device failure or system failure of the VNFM, or a backup cut back operation.

Although each exemplary embodiment of the present invention has been described above, the present invention is not limited to the above exemplary embodiments, and further variations, substitutions, and adjustments can be made without departing from the basic technical philosophy of the present invention. For example, the connections between devices, the configuration of each element, and the form of expression of the message shown in each drawing are examples to aid in the understanding of the invention and are not limited to the configurations shown in these drawings. In the following description, "A and/or B" is used in the sense of at least one of A and B. The connection points of the input and output of each block in the drawings include ports or interfaces, but are not shown in the figures.

Figure 12:
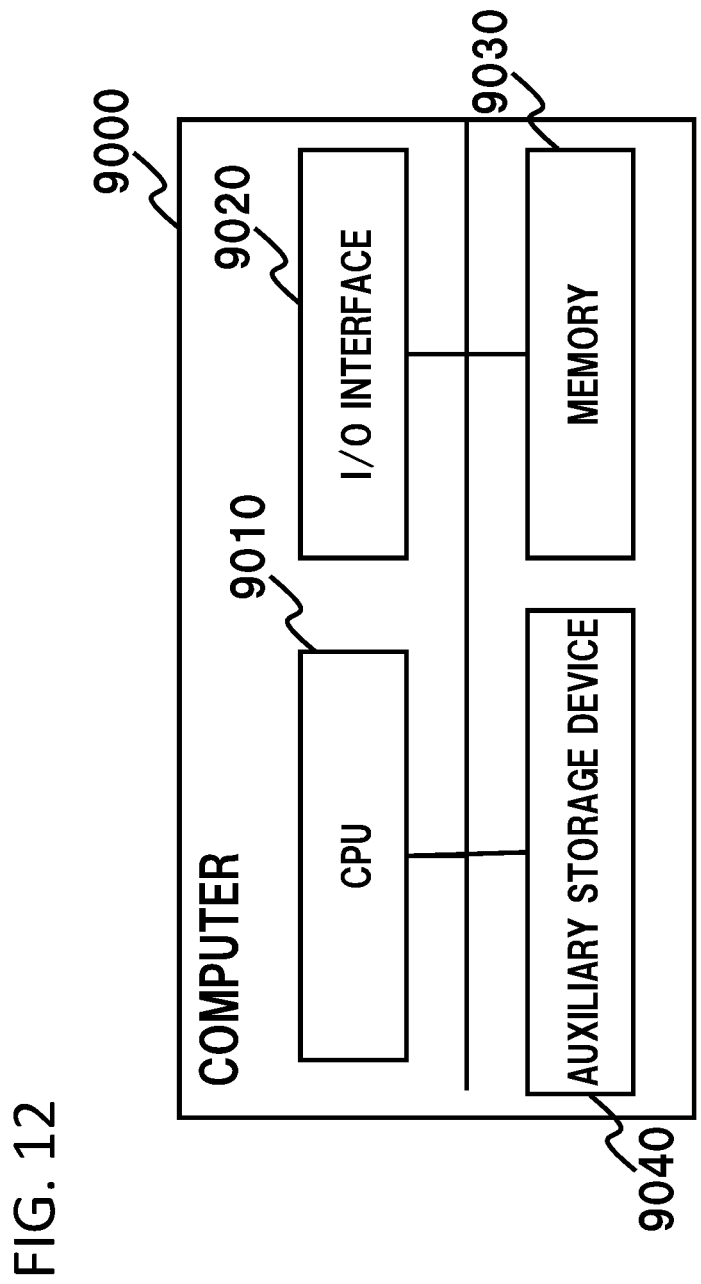
FIG. 12 is a diagram showing an example of a hardware configuration of a controller.

The procedures shown in the first three exemplary embodiments described above can be implemented by a program that causes a computer (9000 in FIG. 12) functioning as an NFVO or VNFM to realize the functions as an NFVO or VNFM. Such a computer is exemplified in the configuration of FIG. 12 with a central processing unit (CPU) 9010, a communication interface 9020, a memory 9030, and an auxiliary storage device 9040. That is, the CPU 9010 of FIG. 12 can execute a program for storing received information, a program for querying virtual resources, and a program for responding, and can be made to perform an update process of each calculation parameter stored in the auxiliary storage device 9040 and the like.

That is, each part (processing means, function) of the NFVO or VNFM shown in the first to third exemplary embodiments described above can be realized by a computer program that causes a processor mounted in these devices to perform each of the above-described processes using the hardware thereof.

Some or all of the above exemplary embodiments may also be described as described in the appendix below, but not limited to the following.

[Mode 1]
(Refer to Above Orchestrating Apparatus of the First Aspect of the Present Invention)

[Mode 2]
The synchronizing part transmits a synchronizing confirmation request designating the VNF to the VNFM, and causes the VNFM to check whether or not the correspondence between the VNF and the virtual resource information has been lost.

[Mode 3]
The synchronizing part transmits a plurality of synchronizing confirmation request to the VNFM, and causes the VNFM to check whether or not the correspondence between the VNF and the virtual resource information has been lost; transmits the corresponding virtual resource information to a plurality of VNF respectively and causes the VNFM to recover virtual resource information assigned to the plurality of VNF.

[Mode 4]
The synchronizing part transmits a synchronizing confirmation request to the VNFM upon occurrence of a work in the VNFM that may have lost the correspondence between the VNF and the virtual resource information.

[Mode 5]
(Refer to Above VNFM Apparatus of the Second Aspect of the Present Invention.)

[Mode 6]
(Refer to Above Managing Method of VNF Information of the Third Aspect of the Present Invention)

[Mode 7]
(Refer to Above Program of the Fourth Aspect of the Present Invention.) Note: Modes 5 to 7 can be developed to Modes 2 to 4 likewise Mode 1.

It is to be noted that each of the disclosures in the abovementioned Patent Literatures etc. mentioned at Citation List is incorporated herein by reference. Modifications and adjustments of exemplary embodiments and examples are possible within the bounds of the entire disclosure (including the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the claims and technological concepts thereof. In particular, with respect to the numerical ranges described in the present application, any numerical values or small ranges included in the ranges should be interpreted as being concretely described even if not otherwise explicitly recited.

SIGNS LIST

10 Orchestrating apparatus
11 Receiving part
12 Storage part
13 Synchronizing part
20, 200 VNF Manager(s) VNFM
21 VNF generating part
22 Notifying part
100 Orchestrating apparatus (NFVO)
300 Virtualized Infrastructure Manager (VIM)
400 NFV-MANO
9000 Computer
9010 CPU
9020 Network I/F
9030 Memory
9040 Auxiliary storage device

The invention claimed is:

1. An orchestrating apparatus, comprising:
a memory configured to store instructions, and
a processor configured to execute the instructions,
the instructions comprising:
receiving virtual resource information from a VNFM (Virtualized Network Function Manager) that generated a VNF (Virtualized Network Function), the virtual resource information uniquely identifying virtual resources assigned to the VNF;
storing the virtual resource information in correspondence with the VNF; and
transmitting the virtual resource information corresponding to a designated VNF to a VNFM that has lost correspondence between the VNF and the virtual resource information, and causing the VNFM to restore the virtual resource information assigned to the VNF,
wherein the transmitting is performed by transmitting a synchronizing confirmation request designating the VNF to the VNFM, and causing the VNFM to check whether or not the correspondence between the VNF and the virtual resource information has been lost.

2. The orchestration apparatus according to claim 1, wherein the transmitting is performed by transmitting a plurality of synchronizing confirmation requests to the VNFM, and causing the VNFM to check whether or not the correspondence between the VNF and the virtual resource information has been lost; and
transmitting the corresponding virtual resource information to a plurality of VNFs, respectively and causing the VNFM to recover the virtual resource information assigned to the plurality of VNFs.

3. The orchestration apparatus according to claim 1, wherein the transmitting is performed by transmitting the synchronizing confirmation request to the VNFM upon occurrence of a work in the VNFM that may have lost the correspondence between the VNF and the virtual resource information.

4. The orchestration apparatus according to claim 1, wherein the VNFM comprises:
a memory configured to store instructions, and
a processor configured to execute the instructions,
the instructions comprising:
requesting an assignment of virtual resources to a VIM (Virtualized Infrastructure Manager) in response to a request from the orchestration apparatus and generating the VNF; and
transmitting the virtual resource information that uniquely identifies the virtual resources assigned to the VNF to the orchestrating apparatus and causing the orchestrating apparatus to hold correspondence between the VNF and the virtual resource information.

5. The orchestration apparatus according to claim 1, wherein the VNFM apparatus checks whether or not the correspondence between the VNF and the virtual resource information is held correctly at a predetermined timing; and
in case of a loss of the correspondence between the VNF and the virtual resource information, the apparatus acquires the correspondence between the VNF and the virtual resource information from the orchestration apparatus and holds same.

6. A managing method of VNF (Virtualized Network Function) information, comprising:
receiving virtual resource information assigned to a VNF from a VNFM (Virtualized Network Function Manager) that has generated the VNF, wherein the virtual resource information uniquely identifies virtual resources assigned to the VNF;
storing the VNF and the virtual resource information in correspondence each other;
transmitting the virtual resource information corresponding to a designated VNF to a VNFM that has lost correspondence between the VNF and the virtual resource information; and
causing the VNFM to restore the virtual resource information assigned to the VNF,
wherein the transmitting is performed by transmitting a synchronizing confirmation request designating the VNF to the VNFM, and causing the VNFM to check whether or not the correspondence between the VNF and the virtual resource information has been lost.

7. The managing method of VNF (Virtualized network Function) information according to claim 6, comprising:

requesting an assignment of the virtual resources to a VIM (Virtualized Infrastructure Manager) in response to a request from an orchestration apparatus and generating the VNF; and transmitting the virtual resource information that uniquely identifies the virtual resources assigned to the VNF to the orchestration apparatus and causing the orchestration apparatus to hold the correspondence between the VNF and the virtual resource information.

8. A computer-readable recording medium storing a program for causing a computer, to execute:

a process of receiving a virtual resource information assigned to a VNF (Virtualized Network Function) from a VNFM (Virtual Network Function Manager) that generates the VNF, wherein the virtual resource information uniquely identifies virtual resources assigned to the VNF;

a process of storing a correspondence between the VNF and the virtual resource information;

a process of transmitting the virtual resource information corresponding to a designated VNF to a VNFM that has lost correspondence between the VNF and the virtual resource information;

a process of causing the VNFM to restore the virtual resource information assigned to the VNF, and a process of transmitting a synchronizing confirmation request designating the VNF to the VNFM, and a process of causing the VNFM to check whether or not the correspondence between the VNF and the virtual resource information has been lost.

9. The computer-readable recording medium storing a program according to claim 8 for causing a computer, to execute:

a process of requesting an assignment of the virtual resources to a VIM (Virtualized Infrastructure Manager) in response to a request from an orchestration apparatus and generating the VNF; and a process of transmitting the assigned virtual resource information that uniquely identifies the virtual resources assigned to the VNF to the orchestration apparatus and causing the orchestration apparatus to hold the correspondence between the VNF and the virtual resource information.

10. The managing method of VNF (Virtualized Network Function) information according to claim 6, wherein the transmitting is performed by transmitting a plurality of synchronizing confirmation requests to the VNFM, and causing the VNFM to check whether or not the correspondence between the VNF and the virtual resource information has been lost; and transmitting the corresponding virtual resource information to a plurality of VNFs, respectively and causing the VNFM to recover the virtual resource information assigned to the plurality of VNFs.

11. The managing method of VNF (Virtualized Network Function) information according to claim 6, wherein the transmitting is performed by transmitting the synchronizing confirmation request to the VNFM upon occurrence of a work in the VNFM that may have lost the correspondence between the VNF and the virtual resource information.

12. The managing method of VNF (Virtualized Network Function) information according to claim 6, wherein checking is performed whether or not the correspondence between the VNF and the virtual resource information is held correctly at a predetermined timing; and in case of a loss of the correspondence between the VNF and the virtual resource information, the correspondence between the VNF and the virtual resource information is acquired from an orchestration apparatus and stored.

13. The computer-readable recording medium storing a program according to claim 8 for causing a computer, to execute: a process of transmitting a plurality of synchronizing confirmation requests to the VNFM, and a process of causing the VNFM to check whether or not the correspondence between the VNF and the virtual resource information has been lost; and a process of transmitting the corresponding virtual resource information to a plurality of VNFs, respectively and a process of causing the VNFM to recover the virtual resource information assigned to the plurality of VNFs.

14. The computer-readable recording medium storing a program according to claim 8 for causing a computer, to execute: a process of transmitting the synchronizing confirmation request to the VNFM upon occurrence of a work in the VNFM that may have lost the correspondence between the VNF and the virtual resource information.

15. The computer-readable recording medium storing a program according to claim 8 for causing a computer, to execute: a process of checking whether or not the correspondence between the VNF and the virtual resource information is held correctly at a predetermined timing; and in case of a loss of the correspondence between the VNF and the virtual resource information, a process of acquiring the correspondence between the VNF and the virtual resource information from an orchestration apparatus and a process of storing the same.

* * * * *